No. 666,171. Patented Jan. 15, 1901.
P. WHITING.
SAFETY VALVE.
(Application filed Sept. 12, 1900.)
(No Model.) 2 Sheets—Sheet 1.
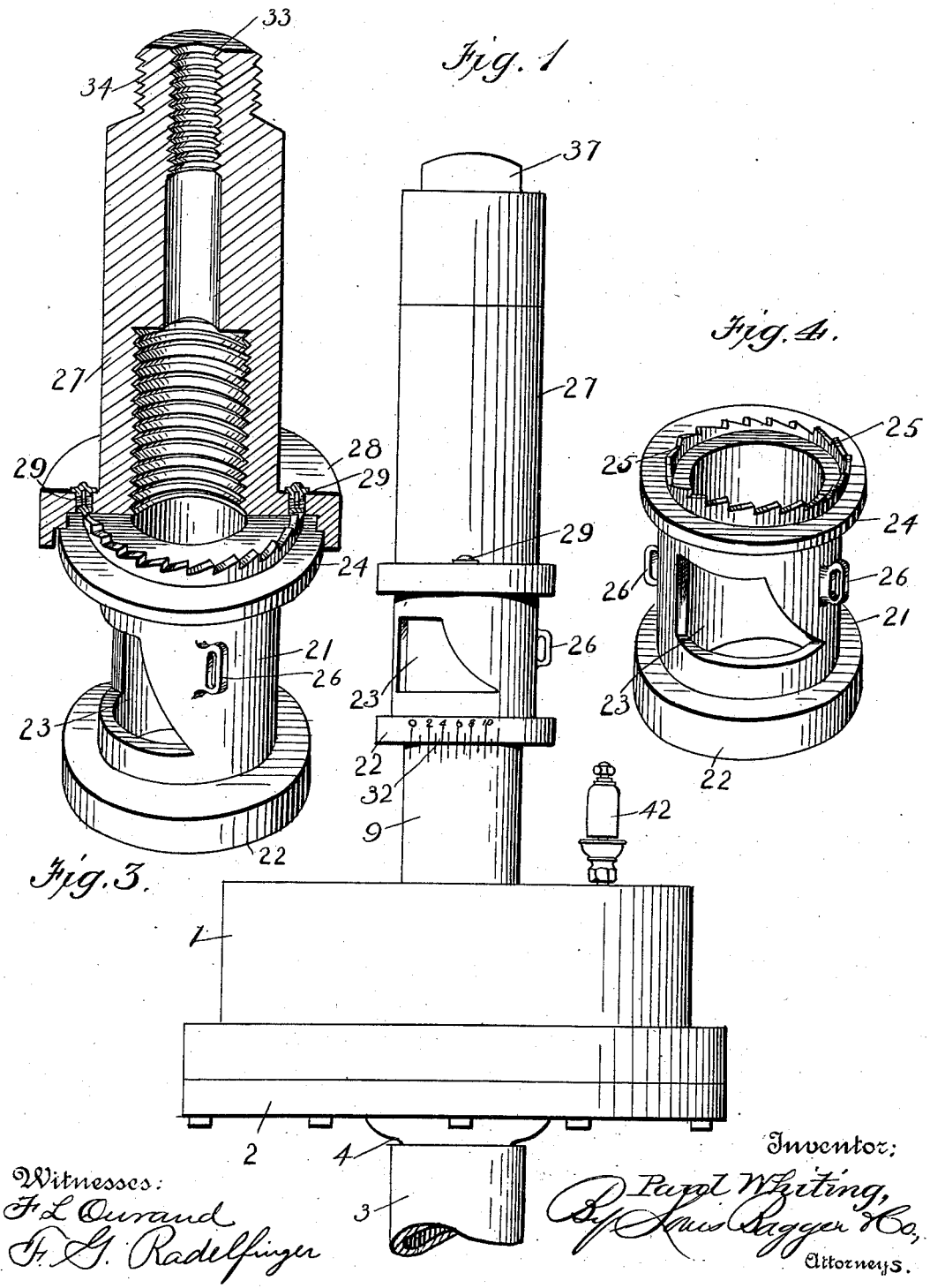

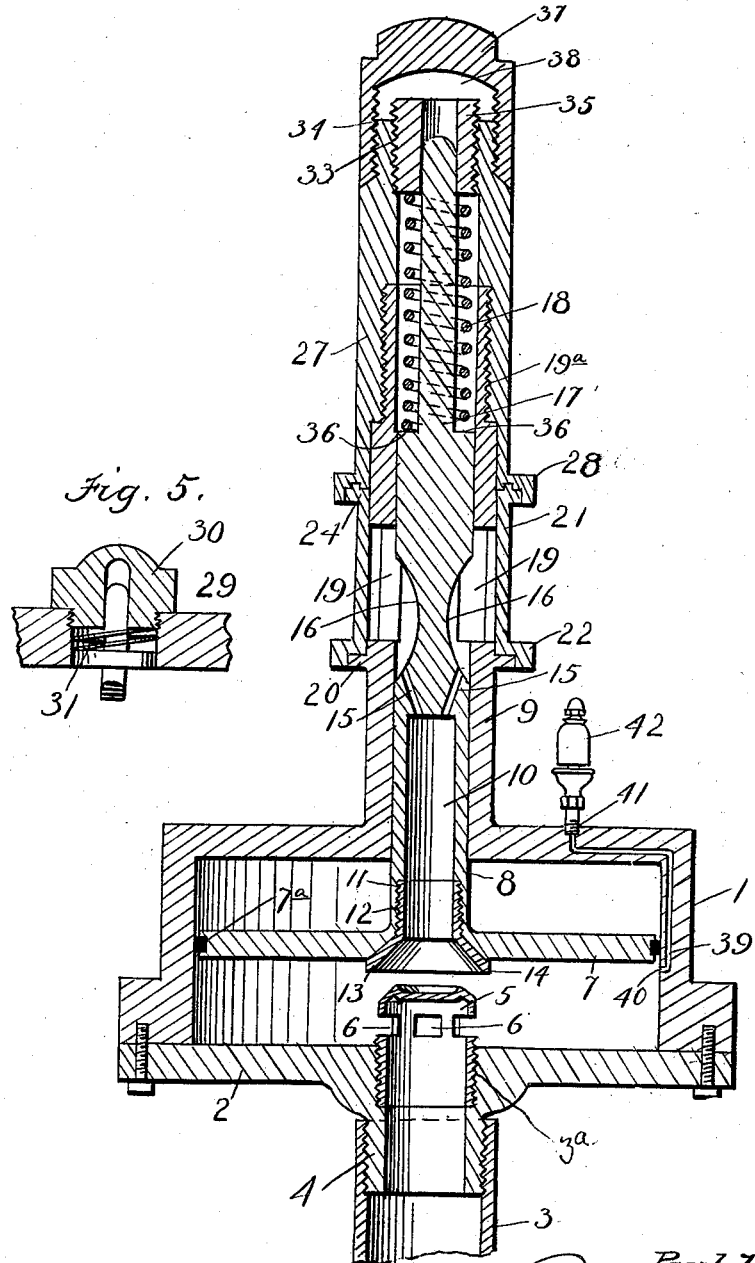

UNITED STATES PATENT OFFICE.

PAUL WHITING, OF EAST LAS VEGAS, TERRITORY OF NEW MEXICO.

SAFETY-VALVE.

SPECIFICATION forming part of Letters Patent No. 666,171, dated January 15, 1901.

Application filed September 12, 1900. Serial No. 29,800. (No model.)

*To all whom it may concern:*

Be it known that I, PAUL WHITING, a citizen of the United States, residing at East Las Vegas, in the county of San Miguel and Territory of New Mexico, have invented new and useful Improvements in Safety-Valves, of which the following is a specification.

My invention relates to safety or pressure-reducing valves, and more particularly to a valve especially designed to be used for regulating the pressure in an air-brake system; but it will be readily understood that its usefulness is not limited to this single application, but it may be used for either air, steam, or liquid.

The object of my invention is to produce a valve of this character which will be efficient in operation and admits of a large range of adjustment.

With these objects in view my invention consists of a novel combination of parts to be hereinafter described and claimed.

In the drawings which accompany this specification and of which they form a part, Figure 1 is an elevation of my valve. Fig. 2 is a transverse section of the same. Fig. 3 is a perspective of the ferrule. Fig. 4 is a perspective of the ferrule attached to the nut, which is shown in section. Fig. 5 is an enlarged sectional detail view of the catch.

Like numerals of reference denote like parts in the drawings wherever they occur.

The numeral 1 designates the cylinder of my valve, which is secured by bolts to a head-plate 2. A pipe 3 is secured to connection 4, which is formed integral with the cylinder-head 2. Screwed in the cylinder-head 2, in the upper end of the aperture $3^a$, connecting with the pipe 3, is a valve 5. This valve is hollow and provided with openings 6 to admit air to the cylinder at all times. The head of the valve is beveled off to make it frusto-conical in contour. This valve may be squared at the bottom to provide attachment for a wrench for convenience in taking it out. A piston 7 fits snugly the cylinder 1 and is fitted with a packing-ring $7^a$. Formed integral with the piston 7 is a stem 8, which extends upward and through the casing 9, formed integral with the cylinder 1. This stem 8 is interiorly bored at 11 for a portion of its length, and secured in the lower end of this bore, which is slightly enlarged at 10 and provided with screw-threads 12, is a conical valve-seat 13. This valve-seat 13 is carefully ground to fit air-tight the valve 5. The projecting rim 14 of the seat 13 is squared to accommodate a wrench. Both the seat and valve are readily removable and may be replaced by new ones when it is desired to do so.

Communicating with the upper end of the bore 11 are four passages 15, which establish communication between said bore and a rounded groove 16, formed in the stem 8 and extending around it. The stem 8 is turned off at its upper end, forming the part 17, which is surrounded by a stiff spring 18.

Formed in the casing 9, just opposite to the groove 16 when the piston is raised, are two slots 19. These slots are small, about one-eighth by three-eighths of an inch, and serve as exhaust-ports when the piston is raised. The casing 9 extends upward and is screw-threaded at its upper end at $19^a$. The casing 9 is also provided with a collar 20, formed integral therewith or shrunk on it, and seated on said collar is a ring or ferrule 21, which is provided with an overhanging rim 22, formed integral therewith and fitting tightly the collar 20. The inner contour of said ferrule is ground to fit air-tight the casing 9 to prevent leakage. This ferrule is provided with an opening 23 of quadrilateral or triangular shape, which serves as an exhaust-vent when turned opposite one of the slots 19. It is made smaller at one side in order that the velocity of egress of the air may be regulated by turning it. The upper edge of the ferrule 21 is provided with a rim 24, having a series of sloping teeth 25, formed integral therewith. These teeth are engaged by catches to be hereinafter described. Thumb-pieces 26 are provided as aids in turning the ferrule. A nut 27 fits the threads $19^a$ and is screwed down close to, but not touching, the teeth in the ferrule and is provided with an overhanging rim 28. Seated in said rim are two catches 29, each provided with a nut 30 and a spring 31. These springs hold said catches in a position engaging the teeth 25, thus keeping the ferrule from turning unless forcibly rotated. A graduated scale 32 is cut on the upper edge of the ferrule in order that the amount the ferrule is turned can be readily determined. The upper end of the nut 27 is interiorly and exteriorly screw-threaded at 33 and 34, respectively. An exteriorly-threaded ring 35 fits the threads 33 and bears against the spring 18, which is held firmly between said ring 35 and shoulder 36. A nut 37 caps the whole structure. This nut 37 is made long enough and is rounded out at 38, so that the stem will not strike it when the valve is suddenly unseated.

I may also provide my valve with a whistle attachment. (Shown in Fig. 1.) This attachment is made very conveniently as follows: The side wall of the cylinder has a tortuous passage 39 formed in it which opens at 40 into the interior of the cylinder and at 41 into the open air. The end 40 is positioned so that it is always covered by the piston when the valve is seated and is opened when the valve is unseated. The opening 41 is provided with a small whistle 42. It is obvious that by this arrangement the whistle will be blown every time the valve is unseated.

In operation the spring 18 is adjusted by means of the nut at its upper end to a certain predetermined tension. The spring will therefore hold the piston normally down and seated on the seat 13 and covering the whistle-passage. When the pressure of the air in the pipe 3 rises in excess of the tension of the spring, the piston will be raised, since the air has free access to it by way of the passage 6. The air will thus escape by way of bore 11, passages 15, slots 19, and opening 23. The escape of air can now be regulated or stopped entirely by turning the ferrule 21. As soon as the pressure of the air has been reduced to that of the tension of the spring the valve will be seated again and the flow stopped. The whistle will start to blow as soon as the valve is unseated and will continue to blow until it is again seated.

It will be seen from the foregoing that my valve will automatically open and reduce the pressure in the pipes whenever it gets too high, and the amount of pressure in the pipes can be regulated at will by adjusting the tension of the spring.

Having thus described my invention, what I claim as new, and wish to secure by Letters Patent, is—

1. The combination with the cylinder, of the piston fitting said cylinder, the longitudinally-bored stem secured to said piston, the valve-seat formed in the end of said bore, the valve fitting said seat, and a spring surrounding said stem.

2. The combination of the cylinder, the piston fitting said cylinder, the bored stem secured to said piston, the groove in said stem, the spring surrounding said stem, the casing secured to said cylinder, the slots in said casing, the ferrule adapted to cover said slots, the valve secured to said piston-head, and the valve-seat formed in the said stem.

3. The combination with the cylinder, of the piston fitting said cylinder, the apertured valve secured in said cylinder, the longitudinally-bored stem secured to said piston, the valve-seat formed in the lower end of said bore and adapted to fit said valve, the groove in said stem, the passage communicating with said bore and said groove, the slots formed in the casing secured to said cylinder, and the spring surrounding said stem.

In testimony whereof I have hereunto set my hand in presence of two subscribing witnesses.

PAUL WHITING.

Witnesses:
CHAS. F. MILLER,
W. B. BUNKER.